No. 868,603. PATENTED OCT. 15, 1907.
W. H. GARTLEY.
PROCESS OF PREPARING ILLUMINATING GAS.
APPLICATION FILED OCT. 17, 1906.
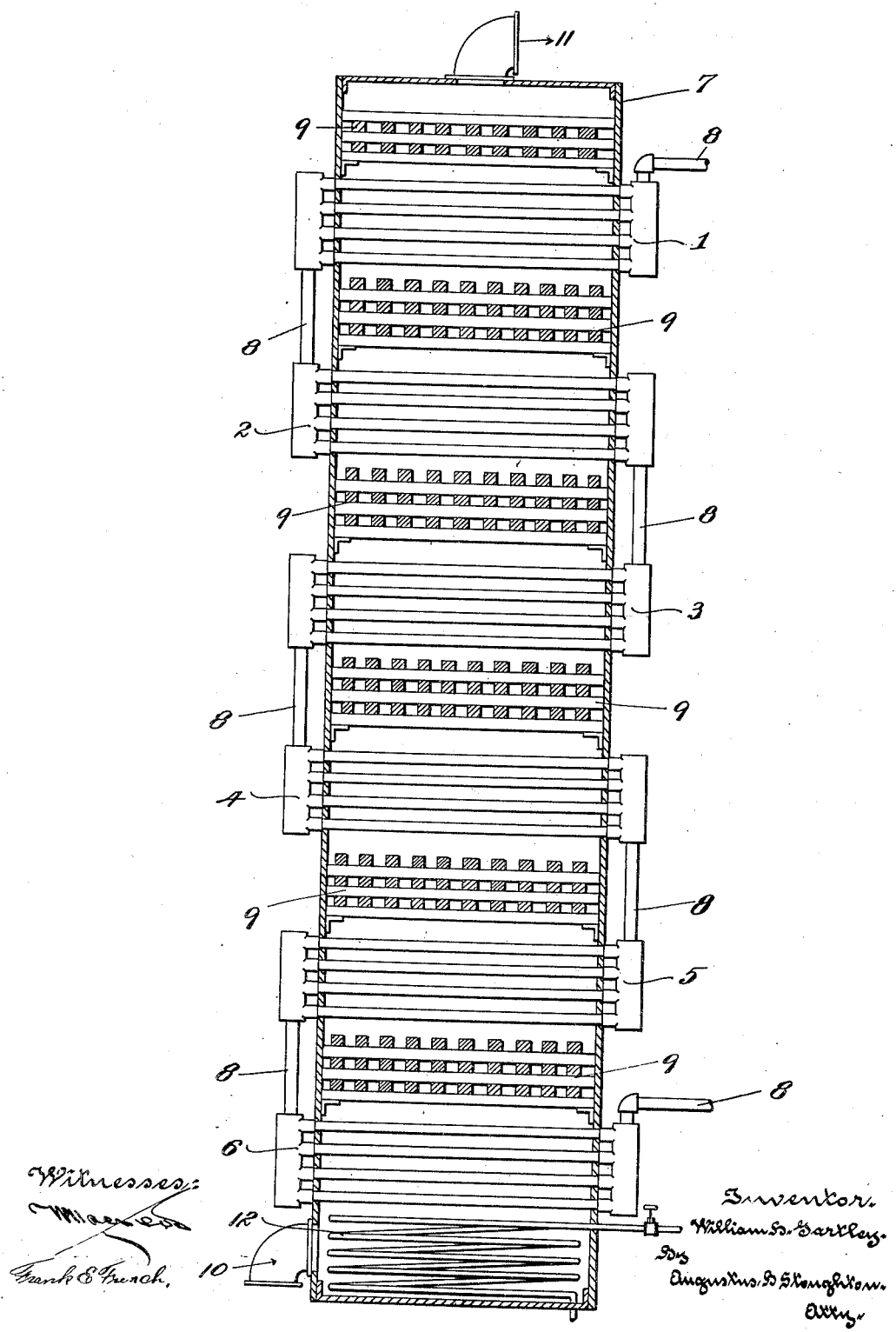

UNITED STATES PATENT OFFICE.

WILLIAM H. GARTLEY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

PROCESS OF PREPARING ILLUMINATING-GAS.

No. 868,603.            Specification of Letters Patent.            Patented Oct. 15, 1907.

Application filed October 17, 1906. Serial No. 339,284.

*To all whom it may concern:*

Be it known that I, WILLIAM H. GARTLEY, a citizen of the United States, residing at the city of Philadelphia, in the county of Philadelphia and State of Pennsylvania, have invented a certain new and useful Process of Preparing Illuminating-Gas for Distribution, of which the following is a specification.

In gas practice, and more especially in water gas practice, the problem of condensation reduces itself to the elimination from the gas of as much of the relatively heavy vapors as possible without eliminating along with them more than a trace of the high tension vapors that can be carried to the burner. The temperatures that are maintained in the gas throughout its condensation and purification are those best suited for the mechanical and chemical reactions and they should be unaffected by the varying atmospheric temperatures at different seasons of the year, but during the passage of the gas through the holders and distributing mains, particularly in winter, the gas is exposed to reductions in temperature. The relatively high tension vapors would remain in the gas at the temperature of the mains but for the presence of the relatively low tension vapors which condense at that temperature. The gas on entering the relatively cool mains being saturated with a composite hydrocarbon vapor must necessarily drop some of its low tension constituents by reason of the reduction of its temperature in the mains. In the dropping out of the relatively low tension vapors there is an inevitable loss of the relatively light vapors or vapors of high tension that could be carried to the burner and which are largely the valuable agents in lighting. To meet the reduction in the candle power following upon the reduction in temperature, it is necessary to make the gas during the winter season of a higher candle power than during the summer to the end that the consumer may get gas throughout the year of uniform candle power. The condensed oil in the mains must be pumped out at regular periods and returned to the works, and this oil contains with the less volatile oils other more volatile oils which would have been carried in the gas had they been separated at the works from those which would inevitably condense at the temperatures existing in the mains. There is also in the gas the vapor of water carried along in proportions depending upon the temperature of the gas, the excess of which will be deposited during the process of cooling in the mains and which must also be pumped from the mains.

The object of the invention is to effect at the works the separation of those vapors, both aqueous and hydrocarbon, which would inevitably condense at the temperature to which the gas is subjected in the mains, in such manner as to retain in the gas all of the higher tension vapors that can be advantageously carried to the burner, or in other words to remove at the works from the gas prior to its distribution such relatively low tension vapors as would condense in traversing the mains by reason of their temperature and would carry with them in condensation relatively high tension vapors which it is desirable to have remain in the gas until its consumption and which but for the presence of the relatively low tension vapors would remain in the gas at the temperature of the mains.

Another object of the invention is to so treat the gas at the works as that it is unnecessary to proceed to the various points through the length of the distribution mains and pump from them condensed vapors, both aqueous and hydrocarbon.

Another object of the invention is to provide a comparatively simple, reliable and efficient method for treating illuminating gas at the works so as to make it stable in composition and candle power through the range of temperature to which it will be subjected in the distribution mains.

To these and other ends hereinafter set forth the invention comprises the improvements to be presently described and finally claimed.

In the drawing there is illustrated, principally in central section, one form of apparatus adapted for the practice of the process.

The zones of progressively decreasing temperature may be provided, as shown in the drawings, by means of groups of pipes 1, 2, 3, 4, 5, 6, arranged at intervals throughout the tower or casing 7, in such a way as to constitute a circulating system 8, through which a cooling medium, as brine, may be caused to circulate. In each of these zones there are, as shown in the drawings, arranged gratings or the like 9. The temperature of the zone adjacent to the group of pipes 1, may be made to correspond substantially to the temperature of the mains, not shown, and through which the gas is to be distributed. From the purifying or condensing apparatus, not shown, gas is led at the temperature which is best suited for the operation of that apparatus by way of the intake pipe 10, to the hottest zone adjacent to the group 6, of pipes. The gas traverses the zones progressively from the hottest to the coolest and is discharged from the outlet 11, to a gas holder and then to the mains, or at any rate to the mains. As the gas traverses the column or tower, it is progressively cooled and vapors are condensed from it, and the condensation may be temporarily received in the apparatus shown upon the various gratings 9. As the gas is thus progressively cooled, vapors are progressively condensed from it, first, the relatively low tension vapors and then the higher, but all of these vapors are relatively lower in tension in comparison with the relatively higher tension vapors of oils which ought to remain in the gas to insure good illumination. As the vapors condense in the various zones in accordance with the temperatures thereof, they carry with them oils which ought to remain vapors at such temperatures. However, these relatively low tension vapors in condensing carrying with them some of the higher tension vapors descend into other zones of high temperature where they give up to the oncoming gas their higher tension vapors, and these higher tension vapors which otherwise would remain in the condensation are carried by the gas through the cooler zones to the mains. Since the last or coolest zone is at substantially the same temperature as the mains, it follows that any vapors that would escape uncondensed from this coolest zone would remain uncondensed in the mains. The temperature of the hottest zone may be such that the more volatile oils which it is desired to have remain in the gas cannot remain in that zone in a state of condensation. Thus vapors that would condense at the temperature of the mains may not leave the tower and the more volatile oils which it is desired to have present in the gas cannot remain in the tower. In consequence of this, condensation in the mains is obviated and the gas reaches the consumers in substantially the same condition that it leaves the works at all seasons. The groups of pipes are progressively heated by the heat of the gas, and if desired, a steam coil, as 12, arranged near the base of the tower may be employed for, as it were, superheating the hottest zone, that is to say, raising the temperature so high that none of the relatively volatile oils can remain as liquids but will be vaporized. Examples of the comparatively high tension vapors which are at first abstracted from the gas by the condensation of lower tension vapors and are again restored to the gas when the lower tension vapors containing them are subjected to a higher temperature than that at which they were condensed are benzene, and toluene. Examples of the lower tension vapors are cumene, mesetylene and vapors of tarry oils.

What I claim is:

1. The process of preparing illuminating gas for distribution mains which consists in subjecting the gas to temperatures progressively ranging from the temperature at which relatively higher tension vapors cannot remain in liquid form to a temperature corresponding with that of the mains, and passing the condensation from the coolest to the hottest temperature in contact with the gas thereby restoring to the gas substantially all the higher tension vapors temporarily extracted by the condensation, substantially as described.

2. The process of preparing illuminating gas for distribution mains which consists in creating zones of progressively decreasing temperature and of which the last corresponds substantially with the temperature of the mains, condensing vapors from said gas by introducing it at the hottest zone and passing it through the intermediate zones and taking it off at the coolest zone, recovering substantially all the higher tension vapors temporarily extracted by the condensation and restoring the same to the gas by subjecting the condensation from each zone to the oncoming gas, and removing from the hottest zone relatively low tension hydrocarbons such as would condense in the mains, substantially as described.

3. The process of preparing illuminating gas for distribution mains which consists in creating zones of progressively decreasing temperature and of which the last corresponds substantially with the temperature of the mains, condensing vapors from said gas by introducing it at the hottest zone and passing it through the intermediate zones and taking it off at the coolest zone, recovering substantially all the relatively high tension vapors temporarily extracted by the condensation and restoring the same to the gas by subjecting the condensation from each zone to the oncoming gas, removing from the hottest zone relatively low tension hydrocarbons such as would condense in the mains, and superheating the last mentioned zone to vaporize the last traces of relatively high tension hydrocarbons, substantially as described.

4. The process of preparing illuminating gas for distribution mains which consists in gradually cooling the ascending gas and permitting the condensation products of the hydrocarbon vapors to drop through cooler to hotter zones and continuously returning the high tension vapors to the gas while progressively cooling the gas to a temperature corresponding to the temperature of the mains, substantially as described.

5. The process of preparing illuminating gas for distribution mains which consists in gradually cooling the ascending gas and permitting the condensation products of the hydrocarbon vapors to drop through cooler to hotter zones, fractionally distilling these condensation products and continuously returning the high tension vapors therefrom to the gas while progressively cooling the gas to a temperature appropriate for the temperature of the main, substantially as described.

In testimony whereof I have hereunto signed my name.

WILLIAM H. GARTLEY.

Witnesses:
FRANK E. FRENCH,
K. M. GILLIGAN.